Feb. 22, 1949. J. E. MILLS 2,462,327
AUTOMATIC DRILL PRESS
Filed Oct. 23, 1945 2 Sheets-Sheet 1

INVENTOR.
John Edwin Mills,
BY George D. Richards,
Attorney

Feb. 22, 1949.  J. E. MILLS  2,462,327
AUTOMATIC DRILL PRESS

Filed Oct. 23, 1945  2 Sheets-Sheet 2

INVENTOR.
John Edwin Mills,
BY George D. Richards
Attorney

Patented Feb. 22, 1949

2,462,327

UNITED STATES PATENT OFFICE 2,462,327

AUTOMATIC DRILL PRESS

John Edwin Mills, East Orange, N. J., assignor to Excel Automatic Products, Inc., Newark, N. J., a corporation of New Jersey Application October 23, 1945, Serial No. 623,960

2 Claims. (Cl. 77—62)

This invention relates to a novel construction of automatic drill press, and the invention has for an object to provide a drill press especially adapted for automatically effecting successive feeding of work pieces to be drilled, from a supply thereof, to a positioning and holding jig subject to a drilling operation, and, upon completion of the drilling operation, thereupon discharging said work pieces from the machine.

The invention has for a further object to provide an automatic drill press mechanism comprising, in combination, a reciprocable rotary drill, a work piece holding jig having a releasable retainer latch for stopping and positioning the work pieces in the path of the drill subject to the desired drilling operation, a reciprocable feed plunger for delivering the work pieces to said holding jig, and guide chute means through which a train of work pieces may gravitate subject to successive engagement by said feed plunger for successive delivery to and discharge from the holding jig.

Another object of the invention is to provide means for effecting relatively timed reciprocable movements of the drill and feed plunger, whereby the work-pieces are successively fed by said plunger into the path of the drill subject to the drilling stroke of the latter, and after drilling successively discharged from the machine, all whereby to effect continuous automatic performance of such work.

Other objects of this invention, not at this time more particularly enumerated, will be understood from the following detailed description of the same.

Figure 1:
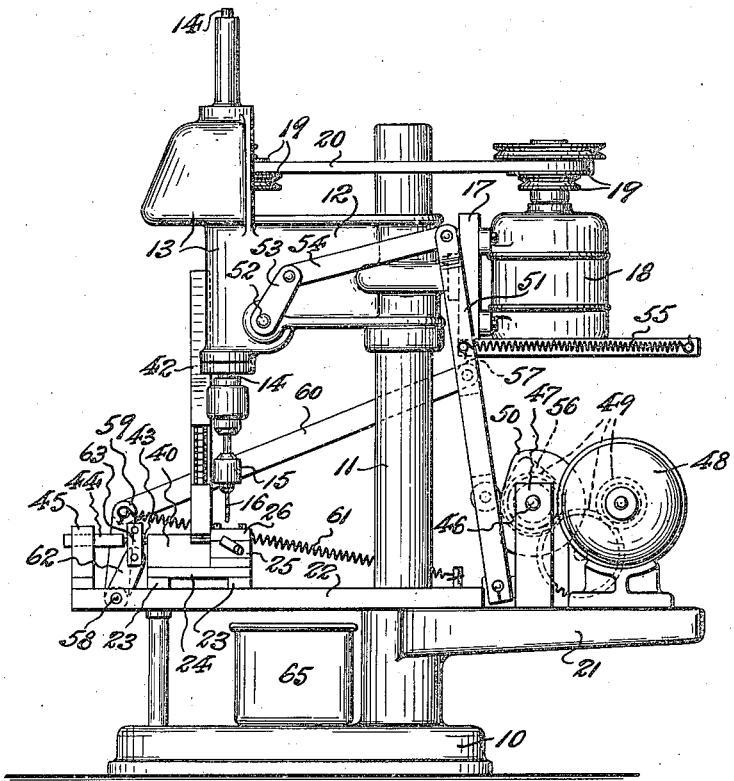

An illustrative embodiment of the invention is shown in the accompanying drawings, in which:

Fig. 1 is a side elevational view of an automatic drill press according to this invention.

Figures 2, 8:
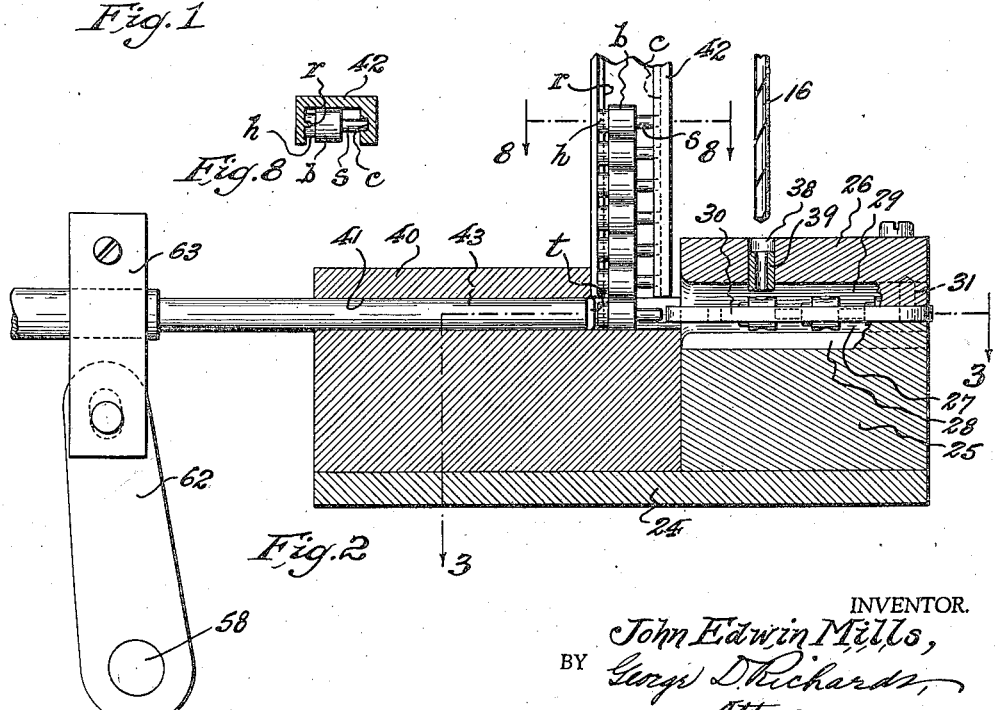
Figure 3:
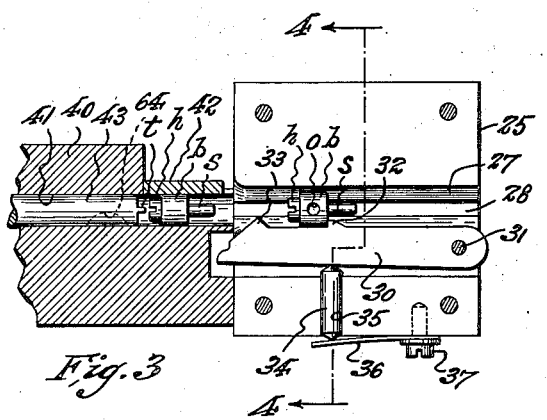
Figure 4:
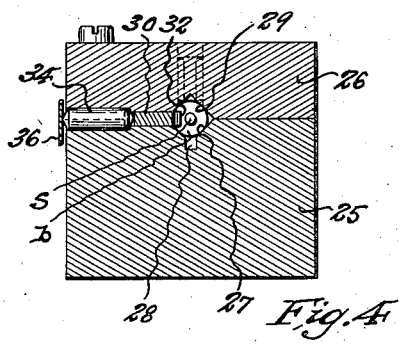
Figure 5:
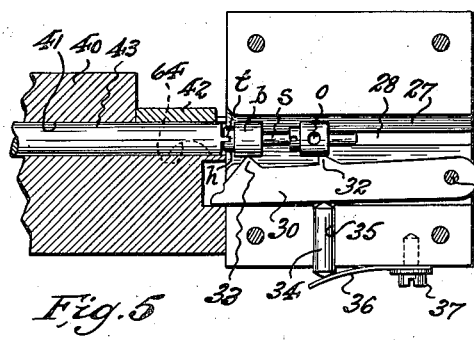
Figure 6:
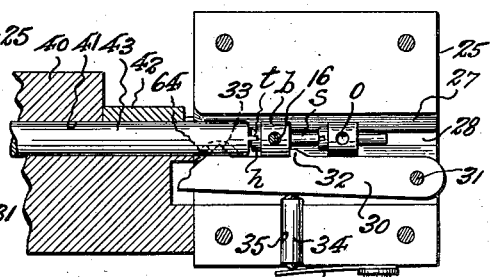
Figure 7:
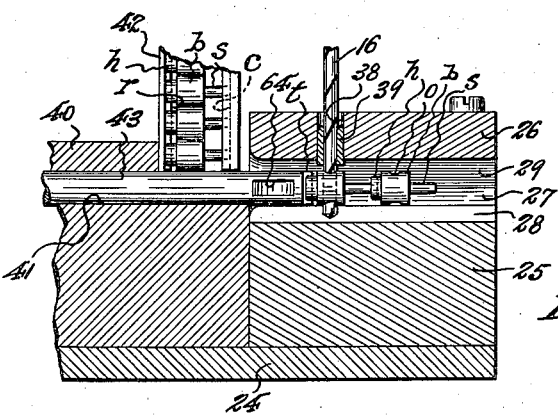

Fig. 2 is a fragmentary longitudinal vertical sectional view through the work piece holding jig and cooperating feed plunger means; Fig. 3 is a horizontal sectional view, taken on line 3—3 in Fig. 2; Fig. 4 is a transverse vertical sectional view, taken on line 4—4 in Fig. 3; Fig. 5 is a horizontal sectional view, similar to that of Fig. 3, but showing a work-piece in process of being advanced into the holding jig and operative to release the retainer latch, whereby to permit release of a previously drilled work-piece subject to discharge from the holding jig; Fig. 6 is a view similar to that of Fig. 3, but showing the feed plunger and retainer latch disposed to position the advanced work-piece ready for drilling; Fig. 7 is a fragmentary longitudinal vertical section, similar to that of Fig. 2, but showing an advanced work-piece in the process of being drilled; and Fig. 8 is a fragmentary cross sectional view of the guide chute which leads the work-pieces to the feed plunger.

Similar characters of reference are employed in the above described views, to indicate corresponding parts.

The illustrative embodiment of the automatic drill press of this invention, as shown, comprises a base 10 having an upstanding column 11 on which is adjustably supported the bracket arm 12 of the drill press head 13. Supported by the head 13, subject to both rotation and reciprocation in the conventional manner, is a drill shaft 14, having at its lower end suitable chuck means 15 by which a drill 16 is operatively coupled to said shaft. Affixed to the rear end of the bracket arm 12 is a supporting plate 17 upon which is mounted an electric motor 18 adapted to supply power for rotating the drill shaft 14 and drill 16 through interconnecting transmission means comprising pulleys 19 and belt 20. It will be understood, that any other source of power and other types of transmission means may be utilized for effecting operative rotation of the drill shaft 14 and drill 16.

Projecting rearwardly from the column 11 is a secondary base member 21. Affixed to said secondary base member 21, to project forwardly beneath the drill press head and its drill means, are laterally spaced rails 22 which serve to support the work-piece holding jig and cooperative feed plunger means of the mechanism. Affixed to and supported across the rails 22 by cross bars 23 is a platform 24. Suitably affixed upon said platform 24, so as to be disposed beneath the path of reciprocable movement of the drill 16, is a work-piece holding jig. This holding jig comprises a bottom block 25 and a top block 26, the latter being suitably secured to the former. Formed in the upper face of said bottom block is V-shaped channel 27 extending longitudinally therethrough from end to end thereof. Said channel 27 is provided at its bottom with a drill clearance channel 28. Formed in the under or bottom face of said top block 26 is a like but inverted V-shaped channel 29, which extends longitudinally therethrough from end to end thereof, and so disposed that, when the bottom and top blocks are operatively assembled, said channel 29 is aligned and registered with said channel 27 of the bottom block, whereby to cooperate therewith to form a work-piece receiving and supporting passage.

Mounted between the bottom and top blocks 25 and 26, so as to border one side of the work-piece receiving and supporting passage provided by the adjoined channels 27 and 29, is a pivoted retainer latch member 30, the free end portion of which is directed toward the receiving end of the holding jig. Said retainer latch member 30 swings on a pivot stud 31 affixed to one of the block bodies. Said retainer latch member 30 is provided, intermediate its ends and on its work-piece passage facing side, with a stop projection 32 which normally enters said passage to lie in the path of a work-piece entering and advanced into said passage. Said retainer latch member 30 is further provided, adjacent to its free end, with a cam nosing 33. Said retainer latch member 30 is yieldably projected into a work-piece receiving and holding passage of the holding jig. This may be variously accomplished, and illustrative of one satisfactory means to such end, as shown, comprises a push-pin 34 slidably supported in a lateral slideway 35 formed intermediate the bottom and top blocks 25 and 26. Said push-pin 34 bears against the outer side of the retainer latch member, and its outer end is exposed at an exterior side of the holding jig, whereby to be operatively engaged by a leaf-spring 36 which is affixed to said exterior side of the latter by an anchoring screw 37.

Extending downwardly through the top block 26 of the holding jig, to communicate with the work-piece receiving and holding passage thereof, is a drill passage 38, within which is affixed a drill guide member 39, through which the drill 16 passes for operative engagement with a work-piece, when the latter is positioned and held in the holding jig by the retainer latch member 30 subject to the drilling operation.

Mounted on the platform 24 in opposition to the receiving end of the holding jig is a feed plunger guide block 40 having a longitudinal bore 41 which is axially aligned with the work-piece receiving and holding passage of the holding jig. Communicating with the forward end portion of said bore 41, at a point adjacent to the receiving end of said holding jig passage, is the discharge end of a work-piece guide and delivery chute 42, through which work-pieces to be drilled gravitate so as to be successively delivered into the bore 41, to lie intermediate a feed plunger means and the receiving end of said holding jig passage. Slidably reciprocable in the bore 41 of said feed plunger guide block 40 is a feed plunger 43. Said feed plunger is provided with a tail-piece 44 which is slidably supported in bearing post 45; the latter being suitably mounted on and supported by said rails 22.

Means is provided for producing relatively timed reciprocable movements of the drill 16 and feed plunger 43, whereby work-pieces are successively fed by the latter into the path of the former subject to its operation. An illustrative form of such means, as shown, comprises a cam shaft 46 journaled in bearing standards 47 upstanding from the secondary base member 21. Also supported on said secondary base member 21 is an electric motor 48 adapted to supply power for operating said cam shaft 46 through interconnecting gearing 49, or other suitable transmission means. Here again it will be understood that any other source of power may be utilized for driving said cam shaft 46. Affixed to and rotated by said cam shaft 46 is a drill reciprocating cam 50 which cooperates with and oscillates a drill reciprocating lever member 51. The drill shaft 14 is adapted to be reciprocated in a well known manner, as by a rack and pinion means (not shown), the pinion of which is affixed to a rock-shaft 52 journaled in the drill press head 13. Affixed to an exterior end of said rock-shaft 52 is a crank-arm 53, which is operatively connected with said drill reciprocating lever member 51 by a link connection 54. Connected with said lever member 51 is a suitably supported and anchored strong pull spring 55 adapted to maintain said lever member 51 in following relation to its actuating cam 50. Also affixed to and rotated by said cam shaft 46 is a feed plunger reciprocating cam 56 which cooperates with and oscillates a feed plunger reciprocating lever member 57. Journaled in and between the outer end portions of the rails 22 is a rock-shaft 58. Affixed to an exterior end of said rock-shaft 58 is a crank arm 59, which is operatively connected with said feed plunger reciprocating lever member 51 by a link connection 60. Connected with said crank arm 59 is a suitably supported and anchored pull spring 61 adapted to maintain said lever member 51 in following relation to its actuating cam 56. Fixed on said rock shaft 58 is a lever arm 62 which is pivotally connected to a coupling member 63 which is affixed to the feed plunger 43, whereby to convert the oscillation of said lever arm 62 into operative reciprocating movements of said feed plunger 43.

In the operation of the machine, while the drill 16 is raised to normal initial inactive position under the control of the cam 50, the feed plunger 43 is retracted by operation of its control cam 56, so that a work-piece may discharge, under gravity, from the delivery chute 42 into the bore 41 of the plunger guide block 40, whereby to lie in front of the feed plunger 43 and opposed to the holding jig in alignment with the work-piece receiving and holding passage 27—29 thereof (see Figs. 2 and 3).

A work-piece having been so delivered, the operation of the control cam 56 thereupon advances the feed plunger 43, whereby to engage and move said work-piece into the holding jig. As the work-piece passes into the receiving and holding passage 27—29 of said holding jig, it will encounter the cam nosing 33 of the retainer latch member 30, and as moved past said cam nosing will, by its engagement therewith, cause the retainer latch member to swing out of the holding jig passage 27—29, whereby to withdraw therefrom the stop projection 32, thus releasing a work-piece previously operated upon, so that the entering work-piece may engage the latter and advance the same beyond said stop projection 32 and toward the discharge end of the holding jig passage 27—29 (see Fig. 5). As the feed plunger completes its work-piece delivery stroke, whereby to dispose the delivered work-piece in proper position for engagement by the drill 16, the cam nosing 33 of the retainer latch member 30 will enter a clearance cavity 64 which is formed in the side of the feed plunger, thereby permitting in-swinging movement of the retainer latch member 30 so as to dispose its stop projection 32 for holding engagement with said work-piece, and so that the latter is firmly held against longitudinal displacement between the feed plunger 43 and said stop projection 32, subject to the drilling operation (see Fig. 6).

The work-piece being positioned ready for drilling, the drill reciprocating cam 50 operates in such timed relation to the operation of the feed plunger control cam 56 as to cause the rotated drill 16 to move downward to and through the guide member 39, and thence through the work-piece (see Fig. 7), and after completing the desired drilling of the latter, said drill 16 is thereupon withdrawn to initial raised position.

The above described cycle of operations will be continuously repeated so long as work-pieces are delivered by the delivery chute 42. The drilled work-pieces will progress through the holding jig passage 27—29 until they escape from the outer end thereof, whence the same may drop into and be collected by a suitable receptacle 65 (see Fig. 1).

It will be understood that the novel automatic drill press according to this invention may be specifically designed to accommodate and work upon a variety of kinds and shapes of work-pieces. As shown, the mechanism is specifically designed to operate upon work-pieces each having a body $b$ provided at one end with a slotted head $h$ and at its opposite end with an axial shank $s$, in such manner that the body $b$ may be transversely drilled to provide a crosswise opening $o$ therethrough, and parallel to the slot of its head $h$. In order to assure delivery of such work-pieces to the feed plunger mechanism and by the latter to the holding jig, with a work-piece properly held subject to the drilling of the crosswise opening $o$ through its body $b$, the end of the feed plunger 43 is provided with a perpendicularly disposed transverse tongue or bit $t$ adapted to enter the slot in the head $h$ of the work-piece delivered for engagement by said plunger, and the delivery chute 42 is provided with means for so guiding the work-pieces descending therethrough that the same will be successively delivered into the bore 41 of the plunger guide block 40 with the slot of a head $h$ aligned to receive the tongue or bit $t$ of the feed plunger. To the latter end, said chute 42 is provided at the interior of one side thereof with a guide rib $r$ to slidably receive the slotted heads $h$ of the work-pieces, so that the latter are guided and delivered in the aforesaid plunger engageable position. Said chute is preferably also provided at the interior of its opposite side with a guide channel $c$ to slidably receive the ends of the shanks $s$ of the work-pieces, whereby to retain the latter against lateral displacement from the chute. As the feed plunger 43 advances and engages its tongue or bit $t$ in the slotted head $h$ of a work-piece delivered by the chute 42, such engagement will hold the work-piece against rotative displacement both during movement thereof into the holding jig by the feed plunger, as well as while held stationary between said plunger and retainer latch member 30 subject to the drilling operation.

It will be understood that some changes could be made in the construction of the automatic drill press and its parts without departing from the scope of this invention as defined in the following claims. It is therefore intended that all matter contained in the foregoing description or shown in the accompanying drawings shall be interpreted as illustrative and not in a limiting sense.

I claim:

1. A work-piece holding jig for an automatic drill press comprising a body provided with a longitudinally extending endwise open work-piece holding passage, said body having a drill guideway perpendicular to the axis of said passages, a latch member pivoted by one end to said body to extend along one side of said passage with its free end directed toward the receiving end of said passage, means to yieldably urge said latch member toward said passage, said latch member having a stop projection intermediate its ends adapted to arrest and hold a work-piece in said passage in position to be drilled, said latch member also having a cam nosing at its free end adapted to be engaged by a work-piece entering said passage, whereby to out-swing said latch member so as to withdraw the stop projection for release of a previously drilled work-piece subject to impulsion by said entering work-piece toward the discharge end of said passage, a reciprocable feed plunger longitudinally aligned with said passage, and operative to deliver work-pieces into and for movement in a train through said passage, means to supply work-pieces subject to the operation of said feed plunger, said feed plunger being adapted to penetrate the receiving end portion of the work-piece holding passage so as to advance and hold a work-piece against the stop projection of the latch member in position to be drilled, and said feed plunger having a clearance cavity in its side rearwardly of its end for the reception of the cam nosing of the latch member, whereby to permit in-swinging movement of said latch member to dispose the stop projection in holding relation to the work-piece advanced by said feed plunger.

2. A work-piece holding jig for an automatic drill press comprising superposed top and bottom blocks formed to provide an intermediate, longitudinally extending, endwise open work-piece holding passage having opposed V-shaped top and bottom walls, the top block having a drill guideway perpendicular to the axis of said passage, a latch member pivoted by one end to and between said blocks to extend along one side of said passage with its free end directed toward the receiving end of said passage, means to yieldably urge said latch member toward said passage, said latch member having a stop projection intermediate its ends adapted to arrest and hold a work-piece in said passage in position to be drilled, said latch member also having a cam nosing at its free end adapted to be engaged by a work-piece entering said passage, whereby to out-swing said latch member so as to withdraw the stop projection for release of a previously drilled work-piece subject to impulsion by said entering work-piece toward the discharge end of said passage, a reciprocable feed plunger longitudinally aligned with said passage and operative to deliver work-pieces into and for movement in a train through said passage, means to supply work-pieces subject to the operation of said feed plunger, said feed plunger being adapted to penetrate the receiving end portion of the work-piece holding passage so as to advance and hold a work-piece against the stop projection of the latch member in position to be drilled, and said feed plunger having a clearance cavity in its side rearwardly of its end for the reception of the cam nosing of the latch member, whereby to permit in-swinging movement of said latch member to dispose the stop projection in holding relation to the work-piece advanced by said feed plunger.

JOHN EDWIN MILLS.

REFERENCES CITED

The following references are of record in the file of this patent:

UNITED STATES PATENTS

| Number | Name | Date |
| --- | --- | --- |
| 1,264,349 | Trundle | Apr. 30, 1918 |
| 1,570,156 | Kingsbury et al. | Jan. 19, 1926 |